Dec. 4, 1928.
J. B. ANDERSON
1,693,773
AIRCRAFT PONTOON APPARATUS
Filed May 31, 1927
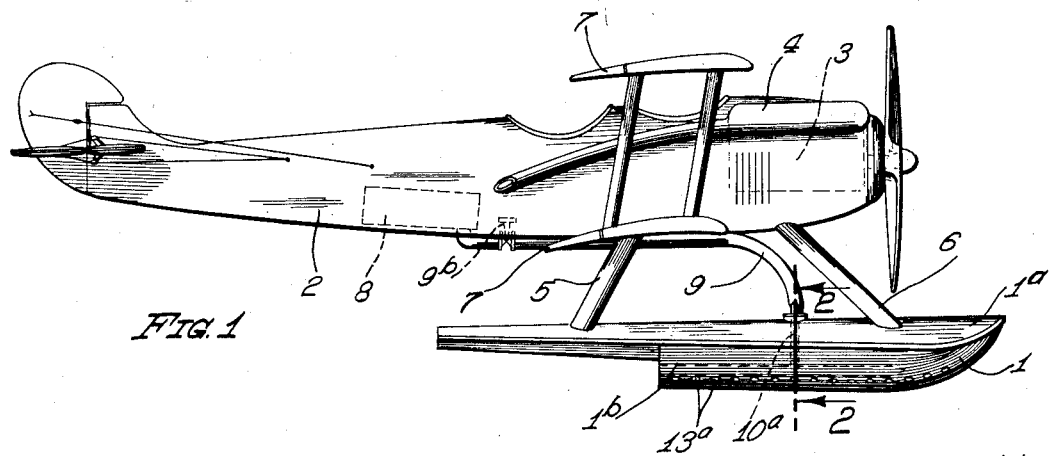
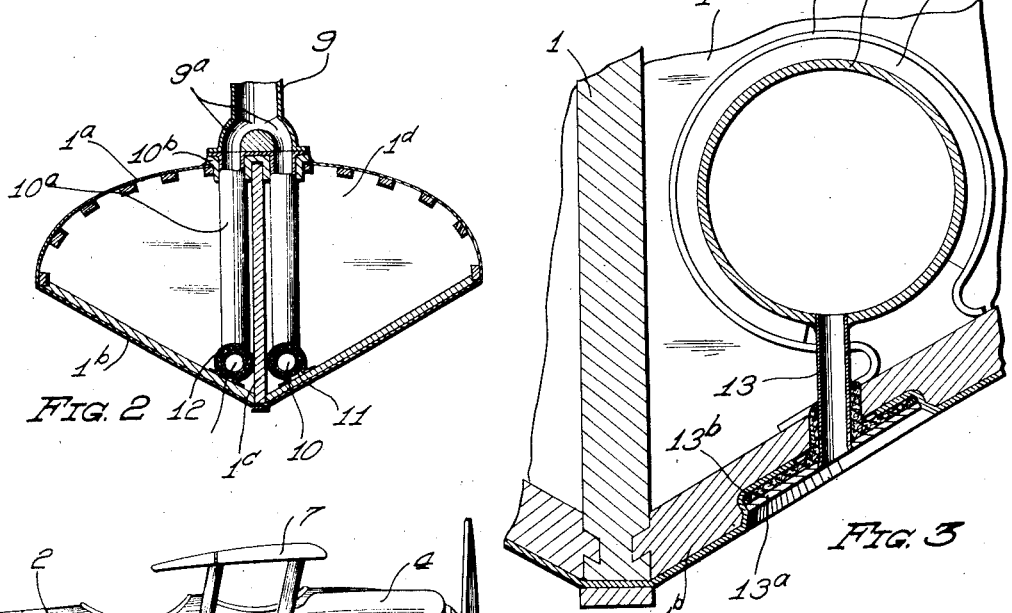
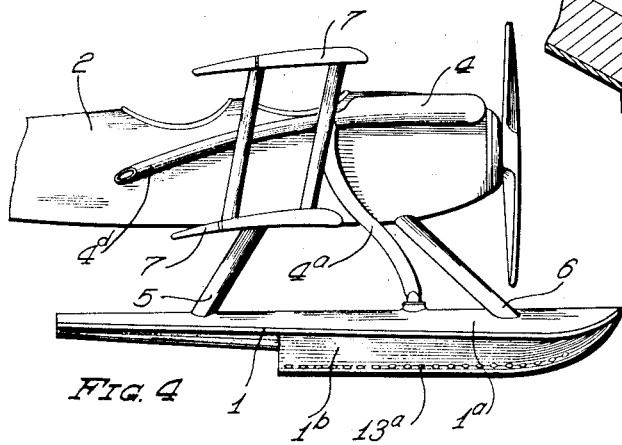
INVENTOR.
JAMES B. ANDERSON
BY A. B. Bowman
ATTORNEY.

Patented Dec. 4, 1928.

1,693,773

UNITED STATES PATENT OFFICE.

JAMES B. ANDERSON, OF SAN DIEGO, CALIFORNIA, ASSIGNOR OF ONE-FOURTH TO L. S. MURRAY, OF SAN DIEGO, CALIFORNIA.

AIRCRAFT PONTOON APPARATUS.

Application filed May 31, 1927. Serial No. 195,222.

My invention relates to floats or pontoons for use in connection with seaplanes, and the objects of my invention are: first, to provide a seaplane float which will reduce the lift required to raise a seaplane from the water; second, to provide a float of this class adapted to agitate the water under it, thereby reducing adhesion; third, to provide a float of this class having provision for discharging exhaust gases through holes in its bottom surface; fourth, to provide a float of this class which is adapted to confine gases or air under pressure for subsequent discharge through its bottom surface; fifth, to provide a float of this class having qualities adapting it for use on smaller airplanes than possible heretofore; sixth, to provide a float of this class enabling planes equipped therewith to rise from a smaller space of water than heretofore possible; seventh, to provide a float which will permit planes equipped therewith to rise from the water with heavier loads than heretofore possible; and eighth, to provide a float of this class which may be heated by the exhaust gases of the engine for the purpose of thawing it out of ice.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a side elevational view of a seaplane equipped with my float, showing the air tank and pipe connection to the float; Fig. 2 is a cross-sectional view along the line 2—2 of Fig. 1, showing the disposition of the air exhaust members; Fig. 3 is an enlarged fragmentary view of my float, showing details of the air exhaust members and outlets; and Fig. 4 is an elevational view of a seaplane equipped with my float in which the exhaust gases from the engine are expelled into the exhaust members.

Similar characters of reference refer to similar parts and portions throughout the several views of the drawings.

The chief parts of my invention and thereto related portions of a seaplane, are the float members 1, fuselage 2, engine 3, engine exhaust 4, supporting struts 5 and 6, wing members 7, air tank 8, air pipe 9, and air exhaust members 10.

The float member 1 may be of any suitable shape and size, and may be secured to the seaplane by struts 5, as shown, or may form the boat portion of a boat-seaplane. The upper and side surfaces $1^a$ are of conventional construction, forming preferably watertight and airtight walls. The bottom surfaces may form an obtuse angle, a central vertical partition $1^c$ extending the length of the float, and lateral bulkheads $1^d$ may be provided. Extending lengthwise on either side of the central partition $1^c$ are air exhaust members 10, preferably in the form of pipes, surrounded by insulating material 11 and secured by straps 12 to the bottom of the float. The air exhaust members 10 are connected at a point intermediate their ends by means of upright branches $10^a$, terminating in a common flange $10^b$ secured to the upper float surface $1^c$. The air pipe 9 is provided with a bifurcated end portion $9^a$ and may be secured to the flange $10^b$ by bolts or other suitable means.

The air exhaust pipes 10 are provided with a plurality of small air outlet passages or pipes 13, which pass through suitable apertures in the float and are secured to plates 13 on the exterior of the float bottom $1^b$, the latter being preferably recessed so as to accommodate the plate $13^a$, the latter being sunk below the float surface, as clearly illustrated in Fig. 3. Suitable calking material $13^b$ is placed beneath the plate $13^a$ and around the pipe 13 in order to insure watertight joints with the float. The air outlets 13 are spaced evenly along both sides of the keel line of the float. An air tank 8, which may be supplied from an air compressor (not shown) driven by the engine 3, may be positioned within the fuselage 2 at any convenient position, and a valve $9^b$, preferably operable from the driver's cockpit, allows air to be forced through the pipe 9 into the exhaust members 10 and through the outlets 13. Any water which may have entered the exhaust members 10 will be immediately expelled and air will then be forced through the outlets 13 into the water beneath the floats. This will cause the water to be agitated and its adhesion to the float surface thereby considerably reduced.

It is obvious that in place of a separate air tank, I may use one or more compartments of my floats for this purpose, suitable provision being made for releasing the air to the air exhaust member from the cockpit. By providing a recess in the outer float surface around the air outlets 13, I encourage the expelled air to form pockets, thereby distributing the breaking up action on the water adhering to the float surface over a greater area.

In the modification illustrated in Fig. 4, I connect one branch 4ª of the exhaust pipe of the motor to the flange 10ᵇ of my float and provide means for closing the exhaust pipe 4, thereby discharging the exhaust gases into the exhaust members 10. The exhaust gases are allowed to be expelled through the outlet 13 until the plane has risen from the water after which the exhaust branch pipe 4ª may be closed and the exhaust pipe 4 reopened. The action of the exhaust gases will be identical to that of the air, as explained above. The exhaust gases may, however, serve an additional function. In the event of the floats becoming frozen in or encrusted with ice, the hot exhaust gases will heat the float and cause the ice to thaw, thereby releasing the float.

Although I have shown only a double row of discharge holes in the various drawings, it is, of course, possible to provide any number of discharge openings, variously arranged and distributed, as well as to vary the shape and size of the recesses.

Though I have shown and described a particular construction, combination and arrangement of parts and portions and certain modifications thereof, I do not wish to be limited to this particular construction, combination and arrangement, nor to the modifications, but desire to include in the scope of my invention, the construction, combination and arrangement substantially as set forth in the appended claims.

Having thus described my invention, what I claim as new and desire to secure by Letters Patent is:

1. In a float of the class described, an air distributing means within the float, a plurality of depressions in the outer bottom float surface, and air outlet passages communicating with said air distributing means and terminating within said depressions.

2. In a float member for seaplanes, a hollow float member with a hollow compartment and provided with a solid bottom, a plurality of shallow recesses in said bottom, means for admitting air into said hollow compartment and a relatively small conductor connecting the interior of said hollow compartment with said shallow recesses through the bottom of said float.

3. In a float member for seaplanes, a hollow float member with a hollow compartment and provided with a solid bottom, a plurality of shallow recesses in said bottom, means for admitting air into said hollow compartment, a relatively small conductor connecting the interior of said hollow compartment with said shallow recesses through the bottom of said float and means for conducting fluid under pressure to the interior of said hollow compartment.

4. In a float member for seaplanes, a hollow float member with a solid bottom, a separate fluid tight chamber positioned therein, means for forcing air into said separate chamber under pressure, a plurality of shallow recesses in the lower surface of the bottom of said float and relatively small conductors connecting the bottom of said recesses with said separate chamber.

5. In a float member for seaplanes, a float member provided with a pair of hollow compartments therein on opposite sides of the middle thereof, a pair of conductors therein extending longitudinally near the bottom of said float, shallow recesses in the bottom of said float below said conductors and relatively small conductors connecting said conductors with said recesses.

In testimony whereof, I have hereunto set my hand at San Diego, California, this 23 day of May, 1927.

JAMES B. ANDERSON.